United States Patent [19]
Court et al.

[11] Patent Number: 5,499,475
[45] Date of Patent: Mar. 19, 1996

[54] DOOR SEAL

[75] Inventors: Melvin T. Court; Alec V. Monte, both of Texarkana, Tex.

[73] Assignee: Newcourt, Inc., Texarkana, Tex.

[21] Appl. No.: 439,181

[22] Filed: May 11, 1995

[51] Int. Cl.$^6$ .................................................. E06B 7/16
[52] U.S. Cl. .................... 49/495.1; 49/368; 49/479.1; 49/490.1; 49/493.1; 49/498.1
[58] Field of Search ............................ 49/490.1, 493.1, 49/495.1, 498.1, 479.1, 475.1, 368

[56] References Cited

U.S. PATENT DOCUMENTS

| | | | |
|---|---|---|---|
| 2,912,727 | 11/1959 | Sehn . | |
| 3,690,037 | 9/1972 | Kempel | 49/380 |
| 3,886,686 | 6/1975 | Urbanick | 49/490.1 |
| 4,006,562 | 2/1977 | Belanger et al. | 49/380 |
| 4,015,368 | 4/1977 | Court et al. | 49/495.1 X |
| 4,119,325 | 10/1978 | Oakley et al. | 277/207 R |
| 4,231,608 | 11/1980 | Sorensen | 296/216 |
| 4,403,452 | 9/1983 | Urbanick | 49/495.1 X |
| 4,490,942 | 1/1985 | Arnheim et al. | 49/374 |
| 4,891,913 | 1/1990 | Shimura et al. | 49/493.1 |
| 4,945,681 | 8/1990 | Nozaki et al. | 49/495 |
| 5,048,887 | 9/1991 | Kunishima et al. | 296/146 |
| 5,107,622 | 4/1992 | Fuchs et al. | 49/484 |
| 5,331,768 | 7/1994 | Takeuchi | 49/493.1 |
| 5,369,914 | 12/1994 | Takeuchi | 49/495.1 |
| 5,388,371 | 2/1995 | Nozaki | 49/377 |

FOREIGN PATENT DOCUMENTS 2235716 3/1991 United Kingdom ................. 49/490.1

*Primary Examiner*—Philip C. Kannan
*Attorney, Agent, or Firm*—P. Weston Musselman, Jr.; Robert A. McFall; Jenkens & Gilchrist

[57] ABSTRACT

A door seal has a base portion comprising straight sections joined at their ends to form corner joints with another section, at least four first seal sections each of which are disposed at a respective one of the corner joints, and a plurality of second seal portions each having a length that extends between a spaced pair of the first seal sections. The first seal sections comprise a pair of spaced lip seals, whereas the second seal sections comprise a lip seal and a compression seal. The seal avoids the problem of undesirable compression seal distortion at the corners joints.

7 Claims, 3 Drawing Sheets

DOOR SEAL

TECHNICAL FIELD

This invention relates generally to a seal for sealing around the perimeter of a door, and more particularly to such a seal having lip and compression seal components.

BACKGROUND ART

There has been a long-felt need for an effective and durable seal around the rear doors of a semitrailer. In the course of transporting cargo over long distances, semitrailers are exposed to severe weather and other environmental conditions that cause deterioration of door seals. The semitrailers are also prone to the buildup of dirt and road salt, resulting in abrasive wear of the seals, and are constantly subjected to door frame movement, or racking, that causes movement between the door seals and adjoining surfaces. Heretofore, semitrailer door seals have typically been lip-type seals formed of polyvinyl chloride or similar thermoplastic material.

In an attempt to provide better seals, some arrangements have proposed the use of a compression seal in addition to a lip seal. For example, U.S. Pat. No. 5,107,622 issued Apr. 28, 1992 to Fuchs et al describes a door seal assembly that has two elements. The outer element is a double lip seal, whereas the inner element, in one embodiment, is a compression seal.

Compression seals provide a biased seal against an adjacent opposed surface that is generally better, and tighter, than that provided by a lip seal. However, because of their inherent construction, compression seals tend to be undesirably displaced, or distorted, at their corners when the door they are sealing is closed. The excessive distortion of the compression seal at the corners leads to early failure of the seal, requiring replacement.

The present invention is directed to overcoming the above problems. It is desirable to have a door seal that has a lip seal that overlays adjoining outer surfaces, and a compression seal that is compressed against an adjacent opposed surface. Furthermore, it is desirable to have such a seal that avoids the problem of undesirable compression seal distortion at the seal corners. It is also desirable to have such a seal that is formed of a abrasion- and weather-resistant, long wearing elastomeric material.

SUMMARY OF THE INVENTION

In accordance with one aspect of the present invention, a seal for sealing the perimeter of a door having at least four edge surfaces, includes a base portion consisting of at least four straight sections each having a length corresponding with a respective one of the door edges. Each one of the straight base portions are joined at their respective ends to another one of the sections to form a corner joint. The seal also includes at least four first seal sections, one of each being disposed at a respective one of the corner joints of the base portion. Each one of the first seal sections have a pair of lip seals extending outwardly from the base portion and spaced from each other. The first of the pair of lip seals overlays a starface adjacent and aligned with the outside surface of the door when the door is in the closed position, and the second lip seal of the pair abuts an opposed surface spaced from, and generally parallel with, a respective edge surface of the door when the door is in the closed position. The seal also includes a plurality of second seal sections each having a length that extends between a spaced pair of the first seal sections with one of the second seal sections being disposed along at least three of the straight sections of the base portion. Each of the second seal sections have a lip seal that overlays an adjacent surface planarly aligned with the outer surface of the door when the door is in the closed position, and a compression seal having a deformable wall that defines, in cooperation with the base portion, a hollow chamber that extends the length of each second seal section.

Other features of the seal embodying the present invention, include the first seal section having a length that is greater than the height of the compression seal, and less than the width of the base portion.

BEST MODE FOR CARRYING OUT THE INVENTION

Figure 1:
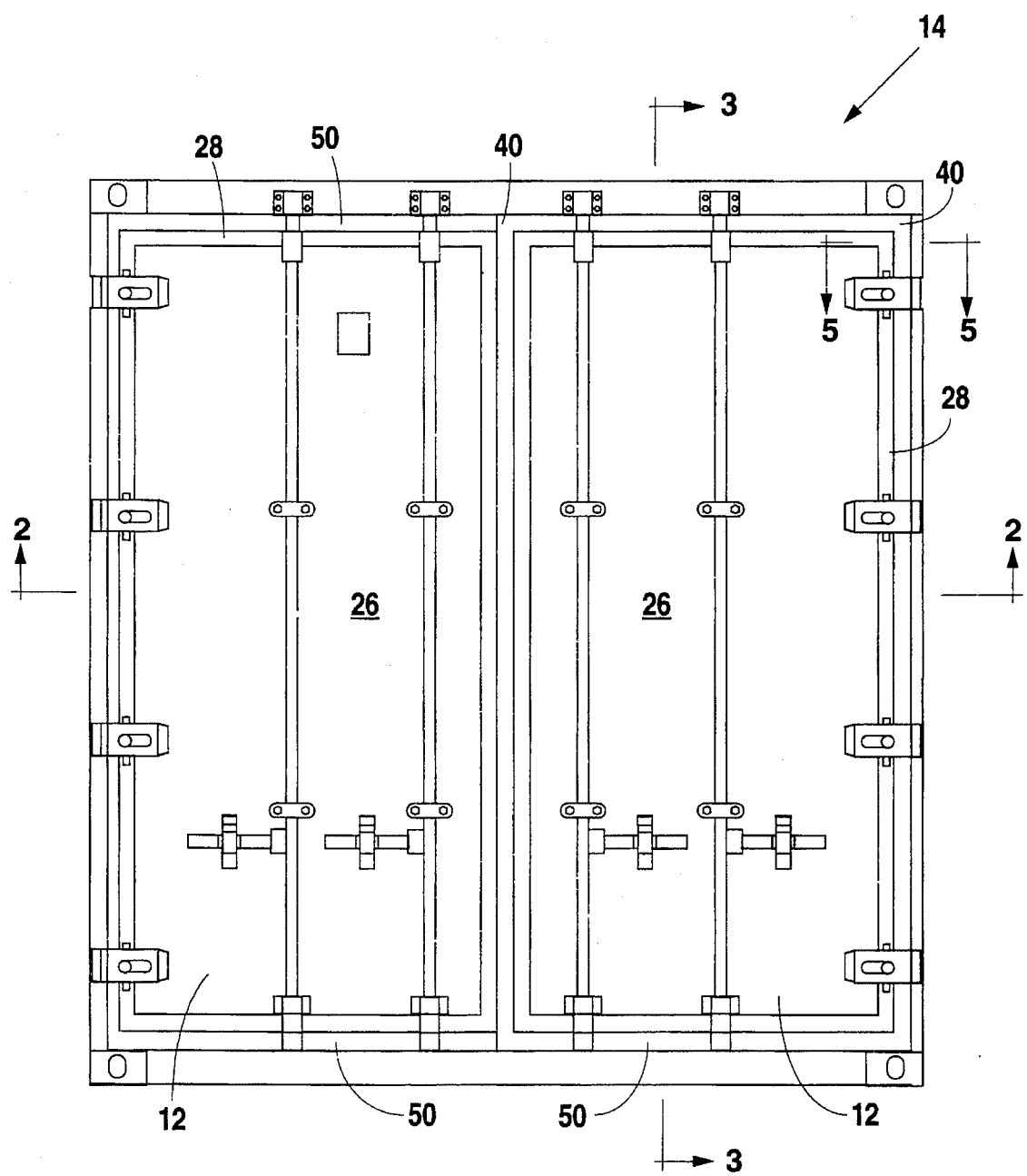
FIG. 1 is an elevational view of the rear doors of a conventional semitrailer with the doors in a closed position and sealed by a seal embodying the present invention.
Figure 2:
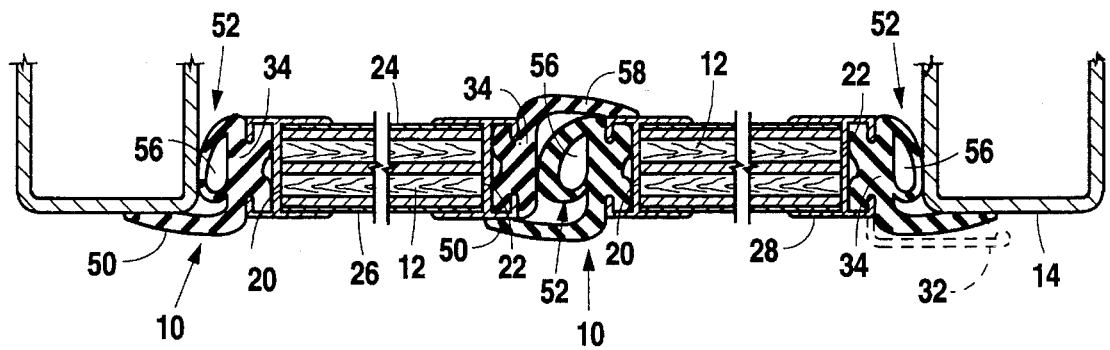
FIG. 2 is a sectional view, taken along the line 2—2 of FIG. 1, showing the seal embodying the present invention.
Figure 3:
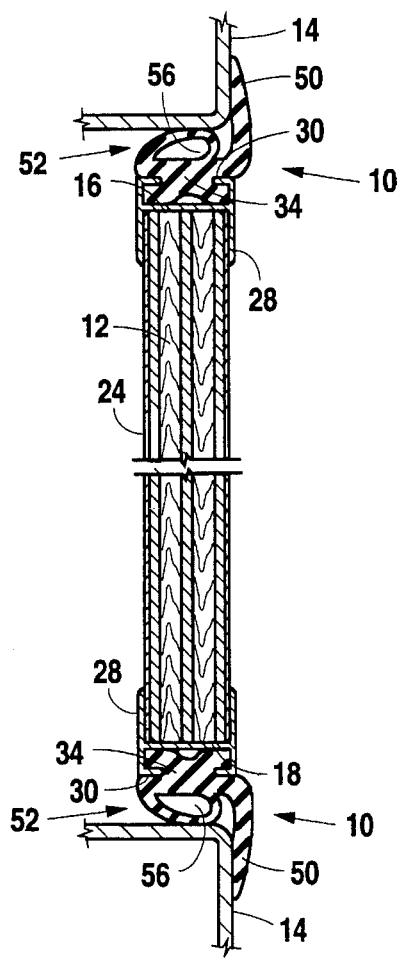
FIG. 3 is a sectional view, taken along the line 3—3 of FIG. 1, showing the seal embodying the present invention.

A seal 10 embodying the present invention is shown in the drawings with particular application to sealing the rear doors 12 of a semitrailer 14. Such doors are generally rectangular and open 270° to provide full access to the interior of the semitrailer. As best shown in FIG. 3, each of the doors 12 have a top edge surface 16 and a bottom edge surface 18. In a similar manner, as shown in FIG. 2, each of the doors 12 have left and right side edge surfaces 20, 22 that extend between the top and bottom edge surfaces 16, 20. Also, each of the doors 12 have an inside surface 24 facing the enclosed interior of the semitrailer 14 when the door 12 is at a closed position, as shown in FIG. 1, and an outside surface 26 facing away from the enclosed interior when the door is at the closed position.

A seal retainer 28 extends completely along, and is removably attached to, each of the edge surfaces 16, 18, 20, 22. The seal retainer 28 is preferably an H-shaped extruded aluminum channel having an interior width substantially equal to the thickness of the door 12, a relatively longer pair of legs extending over the inner and outer surfaces 24, 26 of the door 12, and a shorter pair of legs extending outwardly from the respective edge surface of the door with an inwardly extending flange 30 disposed at each end. Optionally, the seal retainer 28 may have a protective shroud 32, as shown in dashed lines at the right seal member in FIG. 2, that extends outwardly from the external short leg of the retainer 28 and covers the seal 10.

Figure 4:
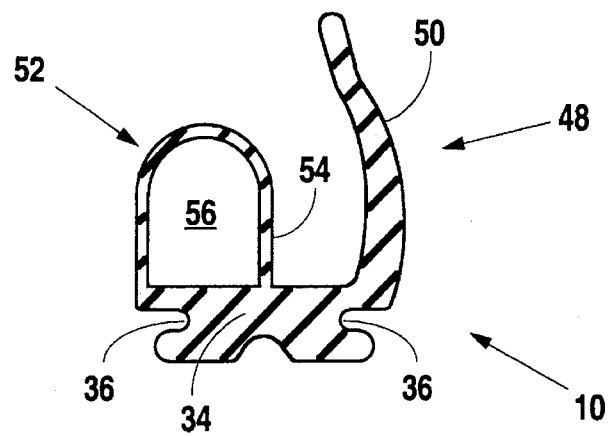
FIG. 4 is a sectional view of one section of the seal embodying the present invention in its free, or noncompressed state.
Figure 5:
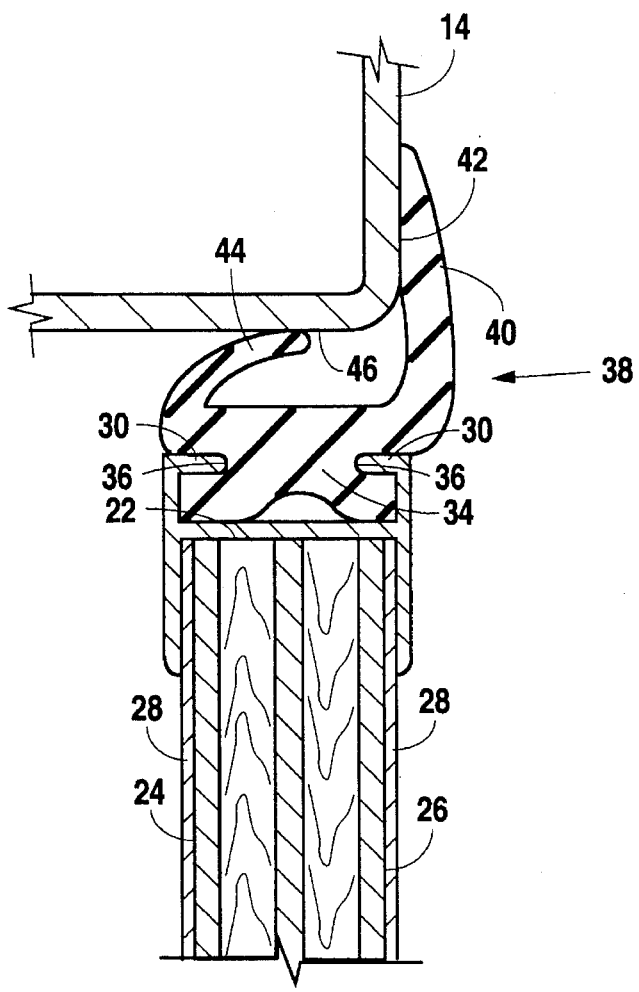
FIG. 5 is a sectional view of another section of the seal embodying the present invention in its compressed state, taken along the line 5—5 of FIG. 1.

As best illustrated in FIGS. 4 and 5, the seal 10 embodying the present invention, has a base portion 34 having a width equal to the interior width of the seal retainer 28 and a pair of opposed notches 36 that, when installed in the seal retainer 28, receive the inwardly extending flanges 30 of the retainer 28. The base portion 34 of the seal 10 comprises four straight sections each having a length that is substantially equal to the length of a respective one of the door edge surfaces 16, 18, 20, 22. Each section is joined perpendicularly at each of its ends with another one of the sections to form four right angle corner joints at the joined ends of the straight sections. Thus, the base portion 34, when viewed on edge, has a rectangular shape comprising four straight sides intersecting at four corners.

The seal 10 embodying the present invention has four first seal sections 38, the cross section of which is shown in FIG. 5. The four first seal sections 38 are respectively disposed at the four right angle corner joints of the base portion 34 and, in that they extend only a relatively short distance along each of the straight sections of the base portion 34, are spaced apart from each other. Preferably, the length of each of the first seal sections 38, as measured along the base portion 34, is less than its width. Each of the first seal sections 38 has a first lip seal 40 that extends outwardly from the base portion 34. When the door 12 on which it is mounted is closed, the first lip seal 40 overlays a surface 42 of the semitrailer 14 that is adjacent to the respective door 12 and substantially aligned in a plane parallel with the outer surface 26 of the door 12. Each of the four first seal sections 38 also has a second lip seal 44 that extends outwardly from the base portion 34 in spaced relationship with the first lip seal 40 and is deformed by, and thereby biasedly abuts, an opposed surface 46, either of the semitrailer 14 or other structure, when the door 12 on which it is mounted is closed.

The seal 10 also includes a plurality of second seal sections 48 each having a cross section as shown in FIG. 4, and a length that extends between a spaced pair of the first seal sections 38. In a single door system, and on at least one door 12 of a double door system, one of the second seal sections 48 is desirably disposed along each of the four straight sections 16, 18, 20, 22 of the base portion 34. Each of the second seals sections 48 have a lip seal 50 that extends outwardly from the base portion 34 and overlays the surface 42 that, as described above, is adjacent and planarly aligned with the outer surface 26 of door 12.

Importantly, the second seal section 48 also has a compression seal 52 that is spaced from the lip seal 50. The compression seal 52 has a U-shaped deformable wall 54 that is connected at each end of the U to the base portion 34 and there forms, in cooperation with the base portion 34, a hollow chamber 56 that extends the entire length of the second seal sections 48. When the door 12 on which the seal 10 is mounted is closed, the compression seal 52 is deformed as shown in FIGS. 2 and 3, so that it biasedly abuts the respective opposed surface 46, and provides a tight, water and dust resistant seal around the door 12.

In a double door system, as illustrated in FIGS. 1 and 2, one of the doors 12, for example the left hand door 12, has a second seal section 48 disposed on only the top edge surface 16, the bottom edge surface 18, and the left side edge surface 20. The section of the seal 10 extending along the right edge surface 22 of the left door 12 has only a lip seal 58. The compression seal along this section is omitted to avoid interference with the compression seal 52 on the left hand edge surface 20 of the right door 12. In this arrangement, the left door 12 is closed first, and then the right door 12 is closed. At the center, i.e., the joint between the two doors, the lip seals 58 and 50 on the respective left and right doors 12 cooperate to provide covering protection for the compression seal 52 which biasedly abuts, and is deformed by contact with, the base portion 34 of the left door seal 10. The outer periphery of the double doors 12 is also sealed by the compression seal 52 which extends along each of the straight sections of the base portion 34 along the top and bottom edge surfaces 16, 18, and along the respective outer side edge surfaces 20, 22 of the left and right doors 12.

In an illustrative embodiment of the present invention, a seal 10 is described that is suitable for use on a door having a thickness of about 2.1 cm (0.825 in). Preferably, the seal 10 is formed of EPDM rubber as described below in greater detail. In the illustrative example, deformable wall 54 of the compression seal 52 has a thickness of 0.20 cm (0.08 in) and a height of 1.5 cm (0.590 in) as measured from the exterior surface of the base portion 34, i.e., the surface facing away from the door edge surface, to the outermost extending surface of the deformable wall 54. When the door 12 is in the closed position, the height of the compression seal 52 is desirably compressed against the respective opposed surface 46 to a height of about 1.11 cm (0.438 in), or to about 75% of its unrestrained height. The compression seal 52 in the center area between the two doors, i.e., between the side edge surface 22 of the left door 12, and the side edge surface 20 of the right door, is desirably compressed to a height of about 1.27 cm (0.50 in), or to about 85% of its free height, when the doors are closed.

An important feature of the present invention is the relief provided against excessive deformation of the compression seal 52 at the corners of the doors 12. The compression seal 52, provides a pressure-biased seal along the straight edges of the door 12, but does not extend into the corners where it would be disadvantageously distorted upon closure of the door 12. At each corner, the first seal section 38 of the seal 10 has two readily displaceable lip seals 40, 44. Furthermore, sealing is optimized, and seal distortion minimized, by controlling the length of each first seal section 38 between desirable minimum and maximum values. To assure an adequate length of compression seal 52 along the side surfaces, the length of each first seal section 38, as measured along the base portion 34 from each corner joint, should be not longer than the width of the base portion 34. In the illustrative example, the width of the base portion 34 is 2.08 cm (0.820 in). To prevent "corner bunching" and excess deformation of the compression seal 52, the seal should not extend any closer to the corner than its free height which, in the illustrative embodiment described herein, is 1.50 cm (0.59 in). Thus, in the described example, the length of each of the first seal sections 38, as measured along each of the base portions 34 from their corner juncture, should be no less than 1.50 cm (0.590 in), and not greater than 2.08 cm (0.820 in). In the actual construction of the seal 10 described above, the length of each of the first sections 38 is about 1.9 cm (0.75 in).

The above dimensions are presented herein as examples representative of the preferred embodiment of the present invention. The values are based on a seal 10 formed of a thermoset elastomer such as ethylene propylene with an added diene monomer (EPDM rubber) having a shore A hardness of about 60 durometer. This material is preferred because of its excellent resistance to wear and abrasion, long life, weatherability, low compression set, and retention of flexibility over a wide temperature range. These characteristics provide a superior seal, particulary during racking, or shifting non-parallel movement, of the rear frame of the semitrailer. Other materials, and other hardness values, may require more or less allowance in the length of the first seal sections 38 to avoid corner distortion of the compression seal 52.

Preferably, the seal 10 is formed of extruded EPDM rubber having a cross section corresponding to that of the second seal section 48. The extrusions are cut to desired lengths corresponding to the length of a selected door edge surface minus the length of the first seal section 38 at each end of the edge surface. The ends of two cut-to-length second seal sections 48 are then placed in a right angle mold having a cavity corresponding to the preselected shape and dimensions of the first seal section 38. The mold cavity is then injected with an uncured liquid, but highly viscous, EPDM rubber compound. The injected material is maintained in the mold until it has cured and bonded to the respective ends of the second seal section 48. This operation is carried out, either simultaneously or sequentially, at each of the corner joints. Upon completion of mold forming a first seal section 38 at each of the four corners, the seal 10 is removed from the molds whereupon it has the shape of a continuous rectangular member with four straight sides corresponding in length with the four sides of the door on which the seal 10 is to be mounted.

Another method of forming the seal 10, although less desirable than that described above, is to make 45° miter cuts at each end of straight sections of extruded seal, each having a length corresponding to the full length of a corresponding edge of a door. The mitered ends are then joined together by a suitable bonding method to form a rectangular structure having both compression and lip seals extending completely around the structure. The corner portions are then formed by cutting away a portion of the deformable wall 54 at each corner to form the second lip seal 44 of the first seal sections 38.

Alternatively, the seal 10 may be formed by premolding the first seal sections 38 and then bonding them to the respective ends of the second seal section 48. However, the earlier described process is preferred over the later described methods because of the better bond achieved between the first and second seal sections 38, 48 during in-mold curing of the first seal section 38.

The seal 10 is secured in the seal retainer 28 by inserting one of the flanges 30 of the retainer 28 in a respective one of the notches 38 formed in the base portion 34. The base portion 34 is then deformed, preferably by an appropriate tool, to engage the opposite flange 30 into the notch 38 on the opposite side of the base portion 34. If it is desired to remove the seal 10, the installation procedure is simply reversed. An important feature of the seal 10 embodying the present invention is that if the seal 10 should become torn or damaged, it can be replaced without removing the retainer 28 or other hardware from the door. This replaceability advantage avoids disturbing the factory seal between the retainer and door.

While the seal 10 embodying the present invention has been described is association with the rear doors of a semitrailer, it should be realized that the seal 10 is suitable for use on doors in other fields of application and use, with corresponding appropriate changes in dimension and material. Also, while described in association with a rectangular door, the seal 10 embodying the present invention is adaptable for use in doors of other geometric shapes having more or less than four side surface edges.

INDUSTRIAL APPLICABILITY

The seal 10 embodying the present invention is particularly useful for sealing around the perimeter of the rear doors of a semitrailer. The seal 10 provides a tight weatherproof, wear resistant, long life seal that is not disadvantageously deformed at the door corners when the door is closed.

The seal 10 embodying the present invention has a lip seal that overlays the surface of the semitrailer that is adjacent and planarly aligned with the outer surface of the door when the door is closed. Furthermore, the seal 10 provides a compression seal between each edge of the door and an opposed surface adjacent the door to prevent the intrusion of foreign matter into the interior of the semitrailer when the doors are closed.

Other aspects, features and advantages of the present invention can be obtained from a study of this disclosure together with the appended claims.

What is claimed is:

1. A seal for sealing the perimeter of a door having an inside surface facing an enclosed chamber and an outside surface facing away from said enclosed chamber when the door is at a closed position, and at least four edge surfaces all having a predetermined length, and a seal retainer extending along each of said edge surfaces of the door, said seal comprising:

a base portion comprising at least four straight sections each having a predetermined width and a length substantially equal to the length of a respective one of said door edge surfaces, each of said straight sections being joined at each end of the length with another one of said straight sections and forming a corner joint at each of the joined ends, and a pair of opposed notches extending along the length of each section and adapted to receive a portion of said seal retainer therein;

at least four first seal sections, one of each being disposed at a respective one of the corner joints of the base portion in spaced relationship with each other and comprising a first lip seal extending outwardly from said base portion and adapted to overlay a surface adjacent to and substantially aligned in a plane with the outer surface of said door when said door is in the closed position, and a second lip seal extending outwardly from said base portion and spaced from said first lip seal and adapted to abut an opposed surface spaced from and in substantial parallel relationship with a respective edge surface of said door when the door is in the closed position; and, a plurality of second seal sections each having a length that extends between a spaced pair of the first seal sections, one of said second seal sections being disposed along each of at least three of the straight sections of the base portion, each of said second seal sections comprising a lip seal extending outwardly from said base portion and adapted to overlay a surface adjacent to and substantially aligned in a plane with the outer surface of said door when the door is in the closed position, and a compression seal spaced from said lip seal and having a deformable wall defining, in cooperation with said base portion, a hollow chamber extending the length of each of said second seal sections.

2. A seal, as set forth in claim 1, wherein said seal includes four second seal portions with one of said second seal portions extending between each of said first seal sections.

3. A seal, as set forth in claim 1, wherein said seal is a single continuous member extending completely around the perimeter of said door.

4. A seal, as set forth in claim 1, wherein said seal is constructed of a synthetic rubber material.

5. A seal, as set forth in claim 4, wherein said seal is constructed of ethylene propylene (EPDM) rubber.

6. A seal, as set forth in claim 1, wherein said compression seal of said second seal section has a predetermined height, and said first seal section has a predetermined length measured along the base portion from a respective corner that is greater than the height of said compression seal.

7. A seal, as set forth in claim 1, wherein said first seal section has a predetermined length measured along the base portion from a respective corner that is less than the width of said base portion.

* * * * *